Dec. 2, 1969    A. R. BREED    3,481,380

THREAD FORMING FASTENER

Filed May 18, 1967    2 Sheets-Sheet 1

INVENTOR.
ARTHUR R. BREED

BY
Yount, Raney, Flynn and Tarolli
ATTORNEYS

Dec. 2, 1969  A. R. BREED  3,481,380
THREAD FORMING FASTENER
Filed May 18, 1967  2 Sheets-Sheet 2

INVENTOR.
ARTHUR R. BREED
BY
ATTORNEYS

United States Patent Office 3,481,380
Patented Dec. 2, 1969

3,481,380
THREAD FORMING FASTENER
Arthur R. Breed, Euclid, Ohio, assignor to The Lamson & Sessions Co., Cleveland, Ohio, a corporation of Ohio
Filed May 18, 1967, Ser. No. 639,356
Int. Cl. F16b *39/28;* B21h *3/02*
U.S. Cl. 151—22                                    12 Claims

ABSTRACT OF THE DISCLOSURE

A self-tapping screw having generally axially displaced thread portions on its leading end to provide material engaging flank areas for forming a mating internal thread on a side wall of an opening in a member is disclosed. Also, a locking screw or fastener having portions of its threads displaced in a direction axially of its body so that these portions interfere with the flanks of a mating internal thread to provide a locking action therebetween is disclosed. Additionally a method for making such fasteners by a thread rolling operation is disclosed.

---

The present invention relates to externally threaded fasteners and a method for making the same, and in particular relates to a self-tapping screw which forms an internal screw thread in a member as the screw is driven into the material of the member.

One of the problems with the use of conventional self-tapping screws wherein the entire or substantially the entire circumferential flank area of a thread is utilized to swage material from a member to form an internal thread is that a high driving torque is required, especially when the material of the member is very hard or dense. Such high driving torques have often caused the threads on the screws to strip and/or the screws to break.

To overcome the above noted problems, self-tapping screws have been developed which decrease the flank area of engagement between the forming threads on the screw and the material. In one known tapping screw construction, the forming threads are provided with lobes at circumferentially spaced locations which extend outwardly of the crests and flanks of the adjoining portions of the forming threads. In another known construction, the forming threads are formed on a body of generally triangular cross section so that only the flank area of the threads at the corners of the body engage the material. Although these known constructions have reduced the amount of driving torque required, they have the disadvantages of being relatively costly and difficult to produce, especially by thread rolling operations.

Accordingly, it is an important object of the present invention to provide a new and improved thread forming fastener or self-tapping screw which forms an internal thread in a member as the fastener is driven into the material of the member and which can be readily and economically produced, and which is provided with forming threads of a construction such that only a low driving torque is required to form the internal thread on the member and with the value of the driving torque required being such that thread stripping and/or breakage of the fastener will not occur or is minimized.

Another object of the present invention is to provide a new and improved self-tapping fastener having a shank portion and an axially tapered leading end portion respectively provided with forming threads and mating threads for forming and mating with the threads formed in the member, and wherein the forming threads on the leading end portion of the screw have circumferentially extending portions which are displaced generally axially of the fastener body to provide material engaging flank areas disposed laterally of the flanks of the adjoining remaining portions of the thread for swaging the material to form a thread therein.

Yet another object of the present invention is to provide a new and improved thread forming fastener, as defined in the next preceding object, and wherein the axially displaced portions of the forming threads have adjacent parts which are displaced axially of the fastener in opposite directions to define displaced thread portions which are wavy or S-shaped, as viewed from above the thread.

A further object of the present invention is to provide a new and improved thread forming fastener of the character described in the preceding objects, and wherein the forming threads are fully formed threads of a standard thread profile and wherein the displaced and non-displaced portions of these threads have the same width between their flanks at any given radial location.

A still further object of the present invention is to provide a new and improved thread forming fastener of the character referred to above, and wherein at least certain ones of the mating threads on the shank portion have helically extending portions thereof which are displaced axially of the axis of the screw and which interfere with the flanks of the mating internal thread formed by the forming threads to provide a locking action therebetween.

The advantages of the novel thread forming fastener or screw of the present invention are that it can be readily and economically produced and that it requires only a minimum or low driving torque when driven into the material of the member to form an internal thread therein. Since only a minimum or low driving torque is required, the problems of thread strippage and/or breakage of the fastener are overcome or minimized.

Another object of the present invention is to provide a new and improved locking fastener having a plurality of screw threads on its leading end portion for freely engaging an internally threaded member having a standard thread therein and a plurality of locking screw threads on its trailing end portion for interfering with the standard internal thread, and in which the locking screw threads have one or more helically extending portions which are displaced axially of the fastener to provide thread flank portions laterally spaced from the flanks of the adjoining non-displaced portions which tightly engage or interfere with the mating internal threads along the flank portions to provide a locking action therebetween.

Yet another object of the present invention is to provide a new and improved method for making a self-tapping screw which includes the steps of rolling a blank having a tapered leading end with a die means to form a raised screw thread thereon and then rolling the screw threads formed on the tapered leading end with a die means to effect an axial displacement of portions of these screw threads to provide generally wavy thread forming portions having flank areas located laterally outwardly from the flanks of the adjoining portions of these threads.

A further object of the present invention is to provide a new and improved method for making a locking fastener which includes the steps of rolling a standard size blank with a die means to form a standard screw thread thereon and then rolling some of the screw threads formed with a die means to effect an axial displacement of portions of these threads to provide flank areas which are located laterally outwardly of the flanks of the adjoining portions of these threads and which are adapted to interfere with the flanks of a mating internal thread to provide a locking action therebetween.

Other objects, novel characteristics and advantages of the present invention will be apparent from those skilled in the art to which it relates and from the following detailed description of the illustrated embodiments thereof made with reference to the accompanying drawings forming a part of this specification, and in which.

Figure 1:
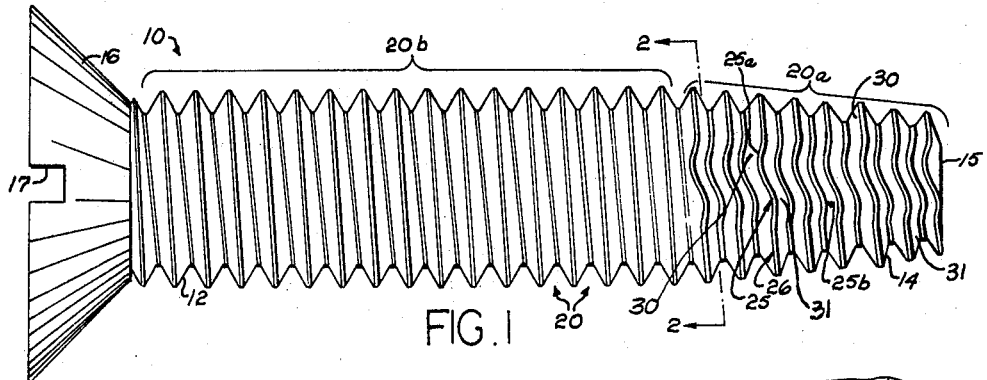
FIG. 1 is a side elevational view of the self-tapping screw embodying the present invention.
Figure 2:
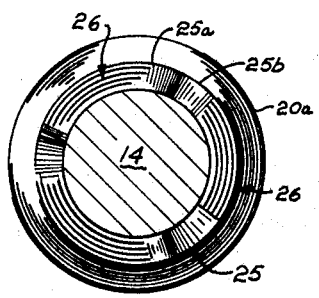
FIG. 2 is a sectional view taken approximately along line 2—2 of FIG. 1.

Referring to FIGS. 1 and 2 of the drawings, a self-tapping screw 10 embodying the present invention is there shown. The screw 10 comprises a metal body having a constant diameter, generally cylindrical shank portion 12 and an axially tapered leading end or pilot portion 14 at one end of the shank portion 12. The leading end portion 14 is axially tapered so as to have a progressively increasing diameter proceeding from its leading or work entering end 15 toward the shank portion 12. The self-tapping screw 10 further comprises a head 16 at the other end of the shank portion 12. The head 16 could be of any suitable shape and provided with any suitable tool engaging surfaces, but is herein shown as being a round head provided with a transverse slot 17 for receiving a screwdriver.

The self-tapping screw 10 has a raised, continuous screw thread 20 on its outer side starting at or adjacent to the leading end 15 of the leading end portion 14 and terminating at or closely adjacent to the head 16. The screw thread 20 comprises a first plurality of fully formed, screw threads 20a on the leading end portion 14 for forming an internal thread 22 on the side wall of an opening 23 in a member 24 and a second plurality of fully formed, standard screw threads 20b on the shank portion 12 forming a continuation of the screw threads 20a for mating with the internal thread 22 formed on the side wall of the opening 23 in the member 24.

The forming threads 20a comprise alternately spaced, spirally or circumferentially extending thread forming and non-thread forming portions 25 and 26. In the preferred embodiment, three thread forming portions 25 at equally spaced circumferential locations are provided. The thread forming portions 25 of the threads 20a are wavy or generally S-shaped, as viewed externally from above the screw threads 20a as shown in FIG. 1, and are smoothly joined at their ends with the adjacent ends of the non-thread forming portions 26 so that no sharp edges or corners occur along the flanks of the threads, which edges would or would tend to provide an undesirable cutting action when forming an internal thread.

The wavy thread forming portions 25, in the illustrated embodiment, comprise a first part 25a which is displaced generally axially toward head 16 of the screw 10 so as to provide a flank area 30 located laterally outwardly from the plane of the left flank of the non-thread forming portion 26, as viewed in FIG. 1, and a second part 25b which is generally axially displaced in a direction away from the head 16 of the screw 10 so as to provide a flank area 31 located laterally outwardly of the plane of the right flank of the non-thread forming portion 26. The extent of the axial displacement of the parts 25a and 25b is shown in exaggerated form in the drawings. Also, the extent of the axial displacement of the parts 25a and 25b of the thread forming portions 25 is uniform from their crests to their roots.

The thread forming and non-thread forming portions 25 and 26 have the same thread profile, which profile is the same as that for a standard thread. That is, the width between their flanks, the thread angle, and the crest and root diameters of the adjacent thread portions 25 and 26 are identical or substantially identical and the same, within tolerance limitations, as that for a standard thread of the same theoretical basic thread form.

It should be apparent from the above that the flank areas 30 and 31 of the parts 25a and 25b of the thread forming portions 25 provide work or material engaging areas which are located laterally outwardly of the flanks of the adjoining portions 26 of the screw threads 20a. Since the threads 20a are of a standard thread profile, the displaced work engaging areas 30 and 31 will be arcuate and in the form of oblique cylindrical surfaces. Moreover, due to the fact that the thread forming portions 25 are generally S-shaped, the areas immediately behind the work engaging flank areas 30 and 31 are relieved and do not engage the material.

Figure 3:
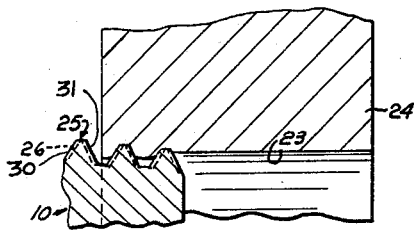
FIGS. 3 and 4 are fragmentary sectional views showing different positions of the screw shown in FIG. 1 as it is driven into the material of a member.
Figure 4:
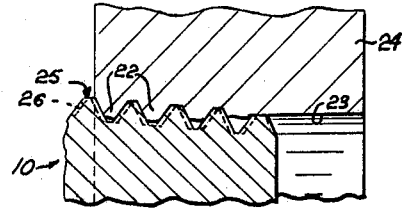

As best shown in FIGS. 3 and 4, when the leading end 15 of the screw 10 is inserted within the opening 23 in the member 24 and rotated, the work engaging areas 30 and 31 of the thread forming portions 25 of the screw threads 20a, will engage the side wall surrounding the opening 23 and form a mating internal thread therein by swaging or displacing the metal from the side wall surrounding the opening 23 radially inwardly toward the roots of the threads 20a. Since the work engaging areas 30, 31 are located laterally outwardly of the flanks of the adjacent non-thread forming portions 26, the latter flanks being indicated by the dotted lines in FIGS. 3 and 4, only these areas and the crest of the threads 20a will come into contact with the material of the member 24. This provides for a limited or minimum area of engagement between the screw 10 and the side wall 23 of the member 24 and thus, only a low or minimum driving torque for the screw 10 is required.

The extent of the axial displacement of the parts 25a and 25b of the thread forming portions 25 is preferably such that the internal threads 22 formed thereby are of a standard pitch diameter or have a space between adjacent threads thereof whose width at any given radial location is slightly greater than the width between the flanks of the standard threads 20b at the corresponding radial location so as to provide for free-running engagement between the threads 20b and threads 22 along their flanks. It should be noted, however, that the crests of the threads 20b will be in touching contact with the roots of the threads 22 when the screw 10 is threadably connected to the member 24. This contact is advantageous in that it provides a resistance to undesired loosening of the screw 10 from the member 24 in addition to the back-out resistance provided by the engagement between the flanks of the threads 20b and 22 when the screw is drawn into tight engagement with the member 24.

Figure 5:
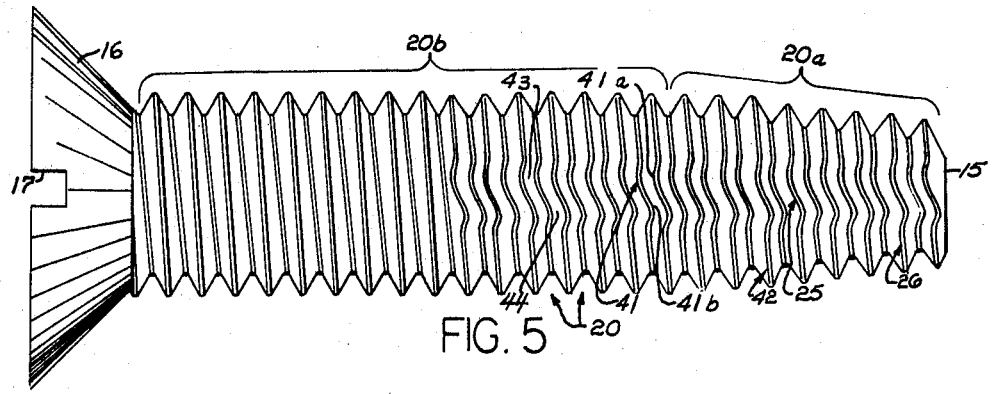
FIG. 5 is a side elevational view of another self-tapping screw embodying the present invention.

FIGURE 5 illustrates another self-tapping screw 40 embodying the present invention. The screw 40 is of an identical construction to the screw 10 except that some of the threads 20b on the shank portion 12 are provided with locking portions for interfering with the flanks of an internal thread formed by the threads 20a, such as the thread 22 formed on the side wall of the member 24, to provide a locking action therebetween. Since the screw 40 in all other particulars is identical to the screw 10, corresponding parts thereof have been given the same reference numerals.

The screw threads 20b of the screw 40, in the illustrated embodiment, are provided with alternately spaced, helically extending locking and non-locking portions 41 and 42, respectively, at three equally spaced helical or circumferential locations. The locking portions 41 are wavy or generally S-shaped thread portions, as viewed from above the threads 20b, and are of the same construction as the thread forming portions 25, and have their ends smoothly joined with the adjacent ends of the non-locking portions 42. The locking portions 41 thus comprise first and second parts 41a and 41b which are respectively displaced generally axially of the screw 40 toward and from the head 16 to provide arcuate flank areas 43 and 44 located laterally outwardly from the planes containing the adjacent flanks of the non-locking portions 42. The extent of the axial displacement of the parts 41a and 41b is at least as great as but preferably slightly greater than the extent of the axial displacement of the parts 25a and 25b of the thread forming portions 25 so that the flank areas 43 and 44 thereof will engage or interfere with the flanks of the internally formed threads 22 on the member 24 when screwed thereinto.

From the foregoing, it can be seen that the locking action between the threads 20b and the threads 22 is achieved as a result of the wedging or pressure engagement between the flanks 43 and 44 of the locking portions 41 and the flanks of the internal threads 22. This pressure engagement may result in an elastic deformation of and/or a further swaging of the metal in the member 24 to cause additional metal from the member 24 to be flowed radially inwardly toward the root of the threads 20b on the screw 40. Also, since the displaced parts 41a and 41b are arcuate, material elastically displaced from the member 24 will flow behind these parts as the screw 40 is tightened and thus, provide an additional locking action. Moreover, since the displaced parts 41a and 41b are displaced a uniform amount from their crest to their roots, the pressure engagement between the flanks 43 and 44 and the flanks of the internal threads 22 will be uniform from their crest to their roots.

The locking portions 41 on the threads 20b when in engagement with the internally formed threads 22 provide a high locking power and thus, a high resistance to undesired loosening of the screw 40 from the member 24 is afforded. Thus, the screws 40 are particularly useful in applications where a high locking power is necessary to prevent undesired loosening, such as in applications where vibrations are encountered. Additionally, it should be noted that the construction of the locking portions 41 is such that the extent of the displacement of the parts 41a and 41b relative to the non-locking portions 42 can be accurately controlled. This control of the displacement of the parts 41a and 41b, and due to the fact that these parts smoothly join the non-locking portions so that no sharp edges are present, enables the prevailing torque values to be accurately controlled, which in turn enables self-tapping locking screws to be produced which have consistent or substantially consistent prevailing torque values.

Although only some of the screw threads 20b of the screw 40 are shown as being provided with locking portions 41, it will of course, be understood that all of the screw threads 20b could be provided with such locking portions, if desired.

Figure 6:
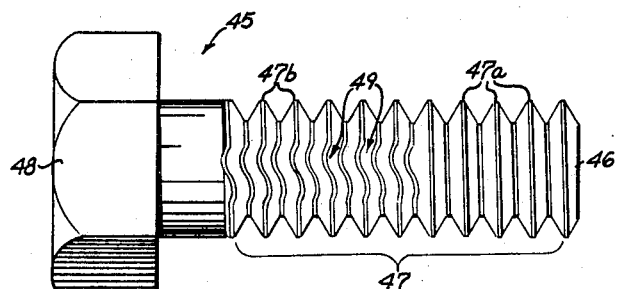
FIG. 6 is a side elevational view of a bolt embodying the present invention.

The use of locking portions like the locking portions 41 for the threads 20b of the screw 40 can also be used in externally threaded fasteners other than self-tapping screws. For example, FIG. 6 shows a bolt 45 for use with an internally threaded member having a standard screw thread therein. The bolt 45 comprises a shank or body portion 46 having a raised, continuous helical screw thread 47 thereon and a suitable head 48 at one end of the shank 46. The screw thread 47 comprises a first plurality of fully formed standard screw threads 47a along the leading end of the shank for freely mating with a standard internal thread in an internally threaded member and a second plurality of fully formed locking threads 47b forming a continuation of the threads 47a. The locking threads 47b are identical to the locking threads 20b on the screw 40, that is, they are provided with helically spaced locking portions 49 like the locking portions 41 for the threads 20b of the screw 40. The locking threads 47b function to provide a locking action with the standard internal threads, and in the same manner as that previously described above in connection with the screw 40.

The present invention also provides a new and improved method for making the self-tapping screw 10 from a standard size blank having a cylindrical shank portion and an axially tapered or frusto-conical leading end portion. The method comprises, in general, the steps of rolling the blank between a pair of thread rolling dies to form a continuous spiral screw thread thereon and then displacing portions of the screw threads formed on the axially tapered portion of the blank generally axially of the blank to provide the wavy thread forming portions 25.

Figures 7, 8:
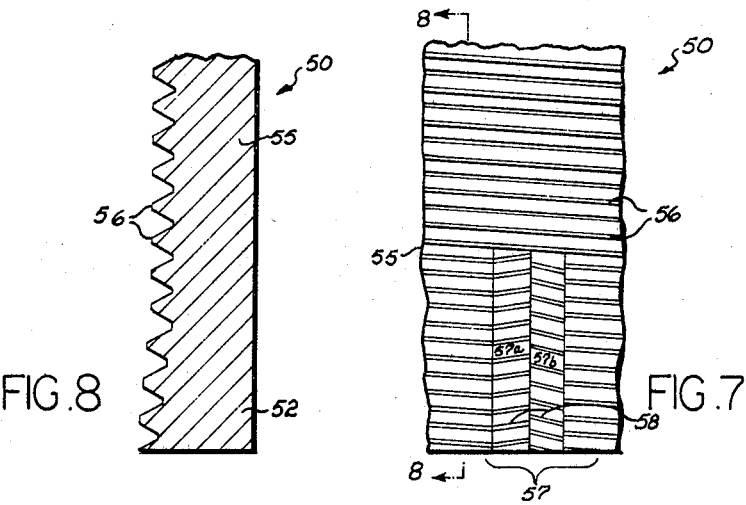
FIG. 7 is a fragmentary front elevational view of a die for rolling the thread on the screw shown in FIG. 1.
FIG. 8 is a fragmentary sectional view of the die shown in FIG. 7 and taken approximately along line 8—8 thereof.

Referring to FIGS. 7 and 8 of the drawings, a rolling die 50 for use in carrying out the method of the present invention is there shown. The rolling die 50 is a generally flat faced composite die provided with a tapered lower end portion 52, as viewed in FIG. 8, which is tapered so as to be complementary with the the tapered leading end portion of the blank. The die 50 comprises a first or main die section 55 having a plurality of diagonally extending die teeth or threads 56 thereon of a shape so as to provide a standard rolled thread on the blank. The die 50 also has a plurality of second die sections, only one of which is shown in FIG. 7 and indicated by the bracket 57, for forming the thread portions 25. The die sections 57 are disopsed at spaced locations within recesses in the tapered lower end portion 52 of the main die section 55 and are suitably secured to the main die section 55 in any suitable manner.

The die section 57 is here shown as comprising two elongated parts 57a and 57b each having a plurality of linearly extending die teeth 58 of a standard profile extending transversely thereof. As shown in FIG. 7, the die teeth 58 on the part 57a are aligned or form an extension of the adjacent threads 56 on the main die section 55, but are angularly disposed or skewed in an upward direction with respect to the adjacent threads 56 on the main die section 55. The die teeth 58 on the die part 57b are skewed with respect to the adjacent die teeth 56 in a downward direction and such that the adjacent ends of the die teeth 58 on the part 57b are slightly laterally offset from the die teeth 58 on the part 57a and the adjacent die teeth 56 of the die section 55, as shown in FIG. 7.

The screw thread 16 is formed by positioning or feeding the blank between a pair of dies like the die 50 and then relatively linearly moving the dies to roll the screw thread 20 and in a manner well known to those skilled in the art. The die threads 56 on the die section 55 will roll a standard profile thread on the blank. The die teeth 58 on the die parts 57a and 57b will function to axially displace the standard thread rolled on the tapered leading end portion at spirally spaced locations to provide the wavy or generally S-shaped circumferentially extending thread portions 25, the die part 57a forming the part 25a of the thread portion 25 and the die part 57b forming the part 25b of the thread forming portion 25.

The advantages of the method of the present invention are that the self-tapping screws 10 can be readily and economically produced, since the thread 20 on the blank can be rapidly rolled thereon and since the die 50 is of an economical construction. Furthermore, it has been found that the die sections 57 will provide wavy or S-shaped thread portions having no sharp edges and which are smoothly joined with the adjoining thread portions.

The screw 40 can be made in the same manner as described above in connection with the screw 10 except that the die parts 57a and 57b would be extended to provide die teeth 58 to axially displace portions of the threads 20b to form the wavy locking portion 41. Likewise, the bolt shown in FIG. 6 can be made in the same manner except that the dies would be a flat faced deposit die having no tapered end portions.

Figure 9:
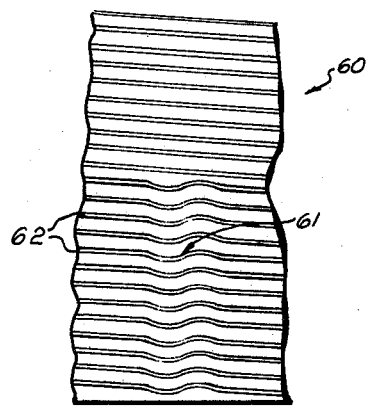
FIG. 9 is a front elevational view of another die for rolling the thread on the screw shown in FIG. 1.

FIG. 9 illustrates an alternate die construction 60 which can be used in place of the die 50 for forming the screw thread 20 on the screw 10. The die 60 shown in FIG. 9 is of a one piece construction wherein spaced portions 61 of the diagonally die teeth 62 on the lower tapered end portion of the die are formed so as to be wavy or S-shaped so as to provide the wavy or S-shaped thread forming portions 25 on the screw thread 10. Likewise, the die threads 62 for rolling the helical thread on the shank portion of the blank can be provided with wavy portions like the portions 61 to provide the helical threads with locking portions like the locking portions 41 on the screw 40.

It will, of course, be understood that the method of the present invention could be carried out by rotating dies on cylindrical die machines rather than by reciprocating a pair of flat composite dies, if desired. Also, it should be understood that generally S-shaped wavy thread portions could be provided in a thread forming and/or locking thread formed on a fastener body of polygonal cross section and with the wavy threaded portions being formed at the corners of the body, if desired.

From the foregoing drawings and detailed description, it will now be readily recognized that the hereinbefore enumerated objects and others have been accomplished and as the present invention provides a novel thread forming screw and locking fastener of an improved construction. It will also be seen that the present invention provides a novel method for making these fasteners.

Although the subject matter of the present invention has been illustrated and described herein to a somewhat detailed extent, it will be understood of course, that the invention is not to be regarded as being limited in scope but includes various changes and modifications.

Having described my invention, I claim:

1. A thread forming fastener for forming a mating internal thread on a side wall of an opening in a member comprising a metal body having a shank portion and an axially tapered leading end portion whose diameter progressively increases from its leading end toward said shank portion, a first plurality of raised screw threads on said leading end portion for forming a mating internal thread on the side wall, and a second plurality of raised helically extending screw threads on said shank portion for mating with the internal thread formed by said first plurality of screw threads to threadably connect the fastener to the member, said first plurality of screw threads on said leading end portion having circumferentially extending portions each of which includes a first section laterally displaced from the crests to the roots thereof relative to the adjoining circumferentially extending portions in a first direction generally axially of the metal body and a second section laterally displaced from the crests to the roots thereof relative to the adjoining circumferentially extending portions is a second direction opposite from said first direction to provide flank areas which are laterally spaced in opposite directions from the spiral plane containing the flanks of the adjoining portions and which are adapted to engage the side wall of said member and swage metal therefrom to form said internal thread.

2. A thread forming fastener as defined in claim 1 wherein said displaced portions of said first plurality of screw threads on said leading end portion are displaced laterally of the spiral plane containing the adjoining portions of the threads substantially a uniform amount from their crests to their roots.

3. A thread forming fastener as defined in claim 1 wherein at least some of said second plurality of screw threads on the shank portion have helically extending portions thereof which are laterally displaced relative to the adjoining helically extending portions in a direction generally axially of the central axis of the metal body to provide flank areas which are laterally spaced from the helical plane containing the flanks of the adjoining thread portions and which interfere with the flanks of the mating internal thread which is formed to provide a locking action therebetween.

4. A self-tapping screw which is adapted to form a mating internal thread on a side wall around an opening in a member when driven therein comprising a metal body having a shank portion provided with the tool engaging head at one end of the shank portion and an axially tapered leading end portion whose diameter progressively increases from its leading end toward its shank portion, a raised, continuous screw thread on said metal body and extending from adjacent the leading end of the leading end portion and terminating on said shank portion adjacent the head, said screw thread comprising a first plurality of screw threads on said leading end portions for forming said mating internal thread in said member and a second plurality of screw threads on said shank portion for mating with the formed internal threads to threadably connect said screw to said member, said first plurality of screw threads having alternately spaced, thread forming and non-thread forming portions, said thread forming portions comprising first and second parts which are displaced from the roots to the crests thereof in opposite directions axially of the metal body and laterally of a helical plane passing through the center of the adjacent non-thread forming portions to provide material engaging areas which extend from the roots to the crests of the flanks of the oppositely displaced parts of the thread forming portions which are laterally spaced from the spiral planes containing the flanks of the non-thread forming portions of the threads for engaging said member to swage metal therefrom to form the mating internal thread.

5. A self-tapping screw as defined in claim 4 wherein said screw thread is a standard thread of the theoretical basic thread form and wherein said displaced parts of said thread forming portions are displaced generally axially of the central axis of the metal body a uniform amount from their crests to their roots.

6. A self-tapping screw as defined in claim 5 wherein said thread forming portions at their opposite ends are smoothly joined with the adjacent end of said non-thread forming portions and wherein said work engaging areas along the flanks of the displaced parts are oblique cylindrical surfaces.

7. A self-tapping screw as defined in claim 4 wherein at least some of said second plurality of screw threads on the shank portion have helically extending portions thereof displaced axially of the central axis of the metal body and laterally of a helical plane passing through the center of the adjoining helically extending portions of the thread to provide flank areas which are laterally spaced from the flanks of the adjoining thread portions and which interfere with the flanks of the mating internal thread which is formed to provide a locking action therebetween.

8. A thread forming and locking fastener comprising a metal body having a shank portion and an axially tapered leading end portion whose diameter progressively increases from its leading end toward said shank portion, a first plurality of thread forming screw threads on said leading end portion for forming a mating internal thread on a side wall of an opening in a work member and a second plurality of raised helically extending screw threads on said shank portion for cooperating with the internal thread formed by said first plurality of screw threads to threadably connect the fastener to the member and which are adapted to interfere with the formed internal thread and effect a locking action therebetween, said second plurality of screw threads on said shank portion having helically extending portions each of which includes a first section displaced axially from its root to its crest in a first direction from a laterally helical plane containing the flanks of the adjoining helically extending portions of the threads and a second section axially displaced from its root to its crest laterally in a second direction from the helical plane containing the flanks of the adjoining helically extending portions of the threads, said displaced portions being axially displaced an extent such that their flanks interfere with the flanks of the internal thread formed by said first plurality of screw threads to provide a locking action therebetween.

9. A thread forming fastener for forming a mating internal thread on a side wall of an opening in a member comprising a metal body having a shank portion and an axially tapered leading end portion whose diameter progressively increases from its leading end toward said shank portion, a first plurality of raised screw threads on said leading end portion for forming a mating internal thread on the side wall, and a second plurality of raised helically extending screw threads on said shank portion for mating with the internal thread formed by said first plurality of screw threads to threadably connect the fastener to the member, said first plurality of screw threads on said leading end portion having circumferentially extending portions which are laterally displaced from the crests to the roots thereof relative to the adjoining circumferentially extending portions in a direction generally axially of the metal body to provide flank areas which are laterally spaced from the spiral plane containing the flanks of the adjoining portions and which are adapted to engage the side wall of said member and swage metal therefrom to form said internal thread, said displaced portions of said first plurality of screwthreads on said leading end portion being displaced laterally of the spiral plane containing the adjoining portions of the threads substantially a uniform amount from their crests to their roots with adjacent parts of said displaced portions laterally displaced in directions opposite to each other.

10. A thread forming fastener as defined in claim 9 wherein said displaced portions of the first plurality of screw threads on said leading end portion are substantially S-shaped when viewed from an external location above the threads.

11. An externally threaded locking fastener for cooperating with a standard mating internal thread on an internally threaded member, and which comprises metal fastener body, an external screw thread formed on the outer side wall of said fastener body and comprising a first plurality of screw threads having a given pitch diameter extending along said outer side wall terminating at a location intermediate the opposite ends of said fastener body and which are adapted to freely engage the standard mating internal threads of said internally threaded member, and a second plurality of screw threads forming an extension of said first screw threads and extending from said location toward the outer end of said fastener body and which are adapted to interfere with the threads on said internally threaded member and effect a locking action therebetween, said second plurality of screw threads having helically extending portions thereof which are displaced from root to crest axially of the fastener body and laterally of a helical plane containing the flanks of the adjoining helically extending portions at their ends being smoothly joined with the adjacent ends of the adjoining portions of the threads and being axially displaced an extent such that their flanks interfere with the flanks of the standard internal threads to provide a locking action therebetween, said displaced helically extending portions having adjacent parts which are displaced axially of the metal body and laterally of the plane containing the adjoining helically extending portions in directions opposite to each other, and wherein the parts are displaced a uniform amount from their crests to their roots.

12. A thread forming fastener as defined in claim 11 wherein said displaced helically extending portions of the first plurality of screw threads on said leading end portion are substantially S-shaped when viewed from a location external and above the threads and wherein said second plurality of screw threads are standard threads.

References Cited

UNITED STATES PATENTS

| | | | |
|---|---|---|---|
| 1,070,247 | 8/1913 | Haines | 151—22 |
| 2,076,041 | 4/1937 | Payne | 85—41 |
| 3,213,742 | 10/1965 | Kahn | 151—22 |

FOREIGN PATENTS

| | | |
|---|---|---|
| 1,186,278 | 1/1965 | Germany. |
| 512,008 | 8/1939 | Great Britain. |

RAMON S. BRITTS, Primary Examiner

U.S. Cl. X.R.

10—10